US006269652B1

United States Patent
Grosskopf

(10) Patent No.: US 6,269,652 B1
(45) Date of Patent: Aug. 7, 2001

(54) REFRIGERATED BODY FOR A TRUCK, TRAILER OR SEMI-TRAILER

(75) Inventor: Peter Volker Grosskopf, Essen (DE)

(73) Assignee: Frigoblock Grosskopf GmbH (DE)

( * ) Notice: Subject to any disclaimer, the term of this patent is extended or adjusted under 35 U.S.C. 154(b) by 0 days.

(21) Appl. No.: 09/384,677

(22) Filed: Aug. 27, 1999

(30) Foreign Application Priority Data

Aug. 28, 1998 (DE) .............................. 198 39 050

(51) Int. Cl.[7] .................................. F25D 17/04
(52) U.S. Cl. ..................... 62/407; 62/239; 62/416
(58) Field of Search ................... 62/239, 407, 416

(56) References Cited

U.S. PATENT DOCUMENTS

| 3,733,849 | * | 5/1973 | Cantagallo et al. | 62/414 |
|---|---|---|---|---|
| 3,961,925 | * | 6/1976 | Rhoad | 62/376 |
| 3,991,589 | * | 11/1976 | Rath et al. | 62/62 |
| 4,377,935 | * | 3/1983 | Curtis | 62/239 |
| 4,467,612 | * | 8/1984 | Weasel, Jr. | 62/78 |
| 5,129,235 | * | 7/1992 | Renken et al. | 62/200 |
| 5,415,009 | * | 5/1995 | Weiner et al. | 62/239 |
| 5,533,275 | * | 7/1996 | Lawton | 34/433 |
| 5,671,609 | * | 9/1997 | Lionetti | 62/407 |
| 5,809,798 | * | 9/1998 | Clarke et al. | 62/408 |
| 5,965,185 | * | 10/1999 | Bianco | 426/449 |

FOREIGN PATENT DOCUMENTS 4410544   12/1994 (DE) .

* cited by examiner

*Primary Examiner*—William Doerrler
*Assistant Examiner*—Mark Shulman
(74) *Attorney, Agent, or Firm*—Sonnenschein Nath & Rosenthal

(57) ABSTRACT

A refrigerated body generally in the form of a cuboid with insulated walls, floor and ceiling with a door in one of the walls. A refrigeration unit is provided for the body with a heat sink heat exchanger unit positioned in the body and a heat source heat exchanger unit exterior of the body. Preferably the heat sink is located below the ceiling in the body and comprises two heat exchanger units with a fan positioned therebetween. The fan blows air in a longitudinal direction and a guide plate arranged parallel to a side wall opposite the door directs air from one heat sink to a discharge location near the floor of the body with the remainder of the air being directed longitudinally through the body.

19 Claims, 3 Drawing Sheets

REFRIGERATED BODY FOR A TRUCK, TRAILER OR SEMI-TRAILER

BACKGROUND OF THE INVENTION

The present invention relates to a refrigerated body for a truck, trailer or semi-trailer.

Such bodies are known from practical experience. In most cases the refrigeration unit is positioned at the front wall such that the cool air stream hits the articles to be cooled in the interior of the bodies from above. These articles, e.g., can be fresh meat, deep frozen food, ice cream, fruit, etc., cattle or pork halves or containers with sensitive goods.

In refrigerated vehicles with compulsory air guiding, which previously has been the rule only in semi-trailers, it is usual to draw the air from the bottom to cool it in an evaporator and guide it backwards through an air duct at the ceiling. However, in oversea containers because of the required very high temperature control occurrence, e.g., for transporting bananas, the compulsory air guiding principle is reversed, and air is drawn above the cargo by the evaporator, is cooled in the evaporator, and in the bottom area the cooled air is blown below the goods into the container.

Because of the limited space previously practically all smaller refrigerated vehicles, and also the so called interchangeable bodies, and mostly also the bodies for large trucks, have no compulsory air guiding such that with tight pallet loading temperature differences in the cargo up to 10° C. cannot be avoided, during heating operation these temperature differences may rise to 20° C. as the circulated wann air will stall above the cargo by convection. With the new stringent EU-temperature-requirements, however, only 2 to 3° C. temperature differences, and even less, may be accepted in the future.

SUMMARY OF THE INVENTION

It is an object of the present invention to further develop a generic body such that the cooling in the interior of the body, even with tight loading, is mostly uniform and in particular is effective in the lower area.

By the fact that the heat exchanger serving as a heat sink is arranged below the ceiling of the body at one of the front walls, or at both sides in the form of two heat exchangers spaced apart in the longitudinal direction of the body, with their longitudinal axis arranged crosswise to the longitudinal axis A of the body, that at least one fan is arranged between the two heat exchangers with the fan blowing air preferably in the direction of the longitudinal axis A of the body through the two heat exchangers, that a guiding plate is arranged in parallel spaced relationship from the front wall opposite to the door such that a part of the total air volume from the heat exchanger adjacent to the front wall flows downwards between this front wall and the guiding plate, and discharges near a bottom of the body, and that the other part of the total air volume flows through the other heat exchanger and discharges in the direction of the longitudinal axis A, the advantageous effect is attained that the air stream from the fan is split into two parts with one of them, after being refrigerated in one of the heat exchangers, will flow along the ceiling of the body, and the other part of the air stream, after refrigeration in the other heat exchanger, will flow downwards between guiding plate and front wall and along the bottom, such that the refrigeration will be mostly uniform.

Advantageously it is provided that about 40 to 60% of the total air volume refrigerated in the ceiling vaporizer is guided downwards through a very narrow slot in the front wall area under high pressure, and that 40 to 60% of the cooled air is discharged along the ceiling backwards with a high discharge velocity (8 to 15 m/s). As only about 50% of the total air volume is blown downwards to the bottom with high pressure by the flat radial fan through the compulsory air guiding, a spacing of the slot of only 20 to 70 mm from the front wall, instead of the previously required 80 to 120 mm, for the first time is possible with a sufficient effect, and refrigeration in a compulsory air guiding even in very tight room conditions in interchangeable bodies. A small slot will generate a relatively high power-loss of the refrigeration unit, however, space is gained. Furthermore, the absolute power loss is small because of the partial air volume.

Advantageously, it is provided that up to four fans are arranged side by side in a direction crosswise to the longitudinal axis A of the body, wherein for practical reasons the fans are alike radial fans with vertically arranged shafts. Thereby a wide air stream is generated which will flow almost uniformly along the bottom and the ceiling of the body.

In order to enhance the effect of the air stream even further, it is provided for practical reasons that at the air discharge side each of the two heat exchangers is provided with a guiding device in form of a nozzle which narrows the air stream and is preferably equipped with control blades. Thereby the velocity of the discharging air and the ejection distance thereof is further increased.

In order to cool the area opposite to the refrigeration unit adjacent to the door in a sufficient manner it is preferably provided that below the ceiling, a ceiling air duct is arranged extending from the one heat exchanger or the guiding device, respectively, to the area of the opposite front wall.

Preferably the exchangers and/or the fans are controllable individually or in groups. Furthermore they are selectively to be defrosted at the one side such that the other side is furthermore operable.

BRIEF DESCRIPTION OF THE DRAWINGS

Embodiments of the invention now are further explained referring to a drawing. It illustrates in FIG. 1 is an embodiment in a partially cut-away plan view.

DETAILED DESCRIPTION OF THE PREFERRED EMBODIMENTS

Figure 1:
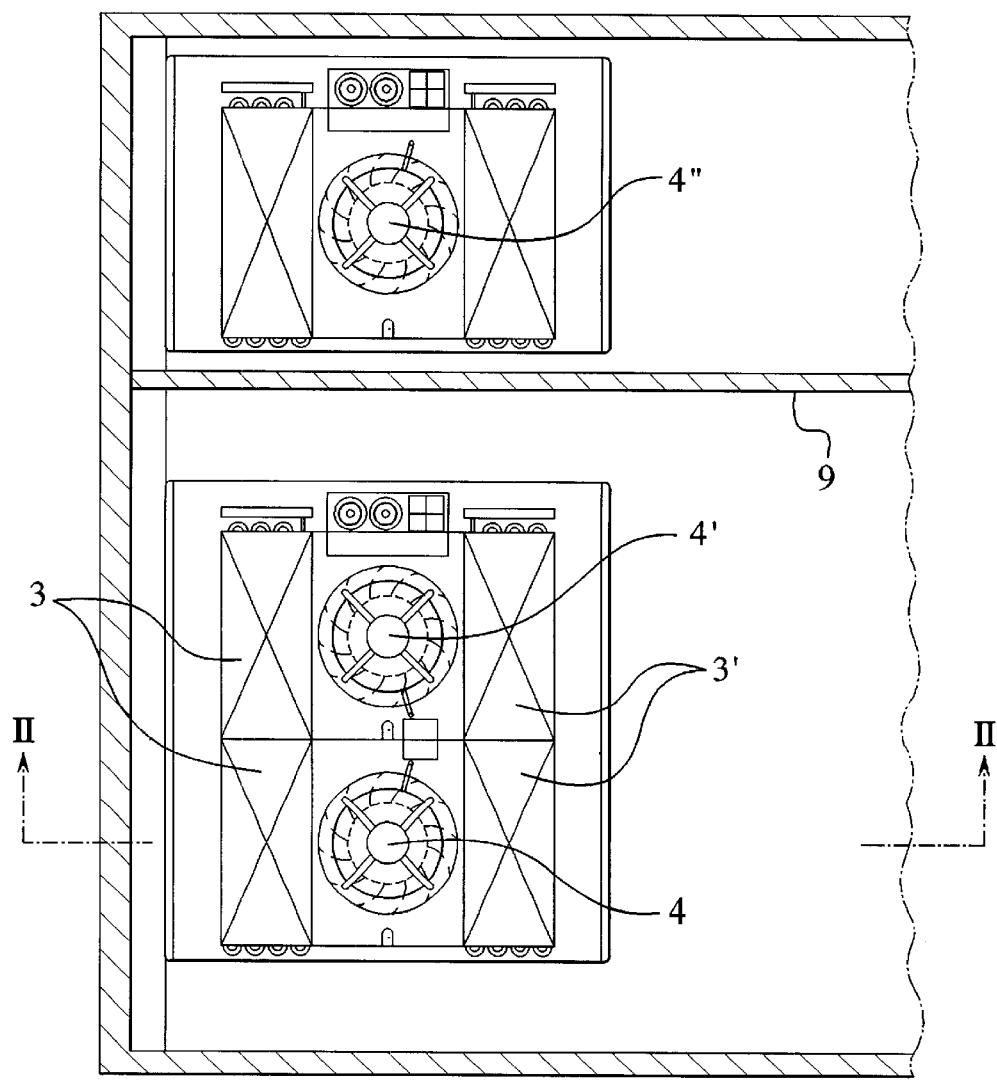

FIG. 1 illustrates a body with two chambers which are separated from each other by a separating wall 9 extending in longitudinal direction. In the upper narrower chamber in the figure a fan 4" is accommodated, and in the adjacent wider chamber there are two fans 4, 4' arranged. Heat exchangers 3, 3' are arranged downstream of the fans 4, 4', 4". In this embodiment, guiding devices 7, 7' (FIG. 2) are arranged such that they narrow and accelerate the air stream.

Figure 2:
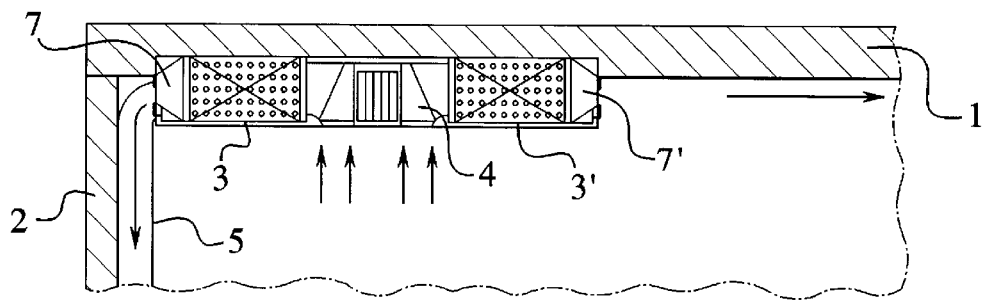
FIG. 2 is a section along the line II—II in FIG. 1.

At the left side in FIG. 2 a guiding plate 5 is illustrated extending also in this case in a spaced relation from a front wall 2. The arrows indicate the flow direction of the air which flows with approximately half of the volume between the front wall 2 and the guiding plate 5, with the other half discharging below the lid 1.

Figure 4:
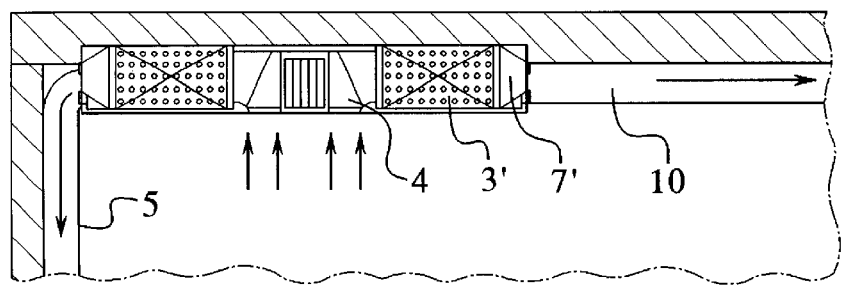
FIG. 4 is a section along the line IV—IV in FIG. 3.
Figure 3:
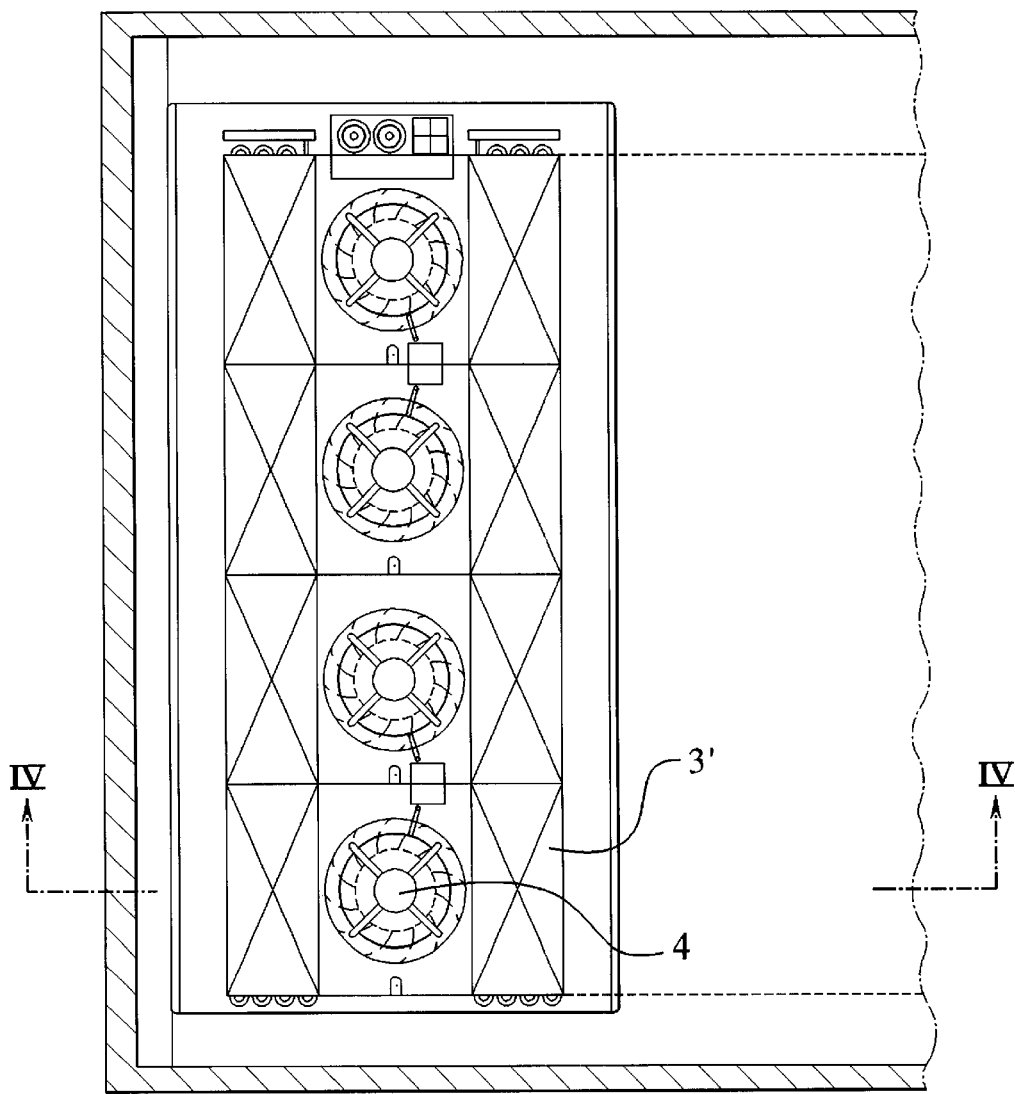
FIG. 3 is another embodiment in a partially cut-away plan view.

FIGS. 3 and 4 illustrate another embodiment wherein in this case four fans 4 are positioned side by side, wherein the arrangement of the heat exchanger 3' (and also the numeral 3 not indicated) as well as the guiding devices, correspond with the previous embodiment. Below the ceiling or lid a ceiling air duct 10 is positioned extending over about 60 to 80% of the length of the body, therethrough the air according to the arrow flows into the area close to the door (not illustrated). Also in this case, approximately half of the air volume is guided downwards through the slot (see arrow) with the slot being positioned between the front wall and the guiding plate 5, whereupon the air discharges close to the bottom.

Figure 5:
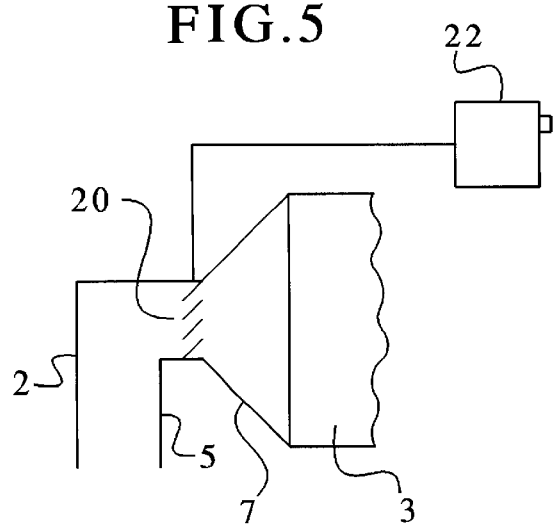
FIG. 5 is a partial schematic illustration of the control blades and control mechanism of the nozzle.

FIG. 5 illustrates the nozzle 7 which is arranged at the air discharge side of the heat exchanger 3. In a preferred arrangement, control blades 20 are provided at the nozzle 7 and may be operated by a control mechanism 22 such that the velocity of the discharging air and the ejection distance thereof can be further increased.

Figure 6:
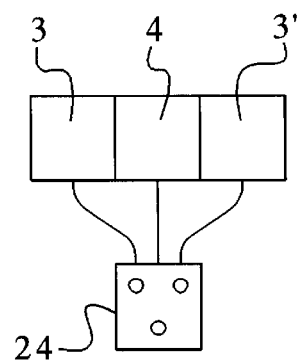
FIG. 6 is a schematic illustration of the control for the fans and evaporators.

FIG. 6 illustrates a control device 24 for the fans 4 and heat exchangers 3, 3'. As is illustrated, each of the heat exchangers 3, 3' may be controlled separately such that one heat exchanger may be defrosted while the other heat exchanger is still operating, and vice versa, in order to maintain a closer constant temperature within the body. Also, the heat exchangers and/or fans may be controllable individually or in groups.

Figure 7:
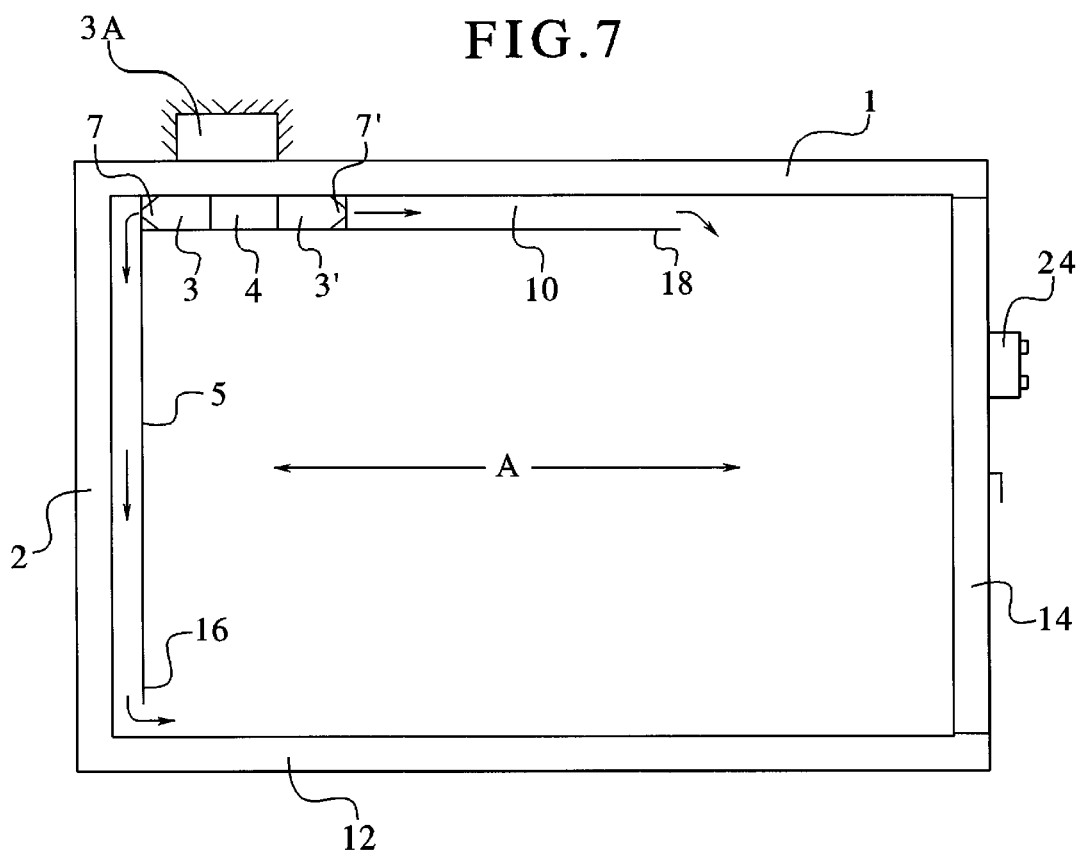
FIG. 7 is a schematic side sectional view of a body incorporating the present invention.

FIG. 7 illustrates, schematically, an overall arrangement of a body having the ceiling 1, sidewalls 2, floor 12 and door 14 such that the body is generally in the form of a cuboid with each of the walls, floor, ceiling and door being insulated. The refrigeration unit has the heat exchangers 3, 3' serving as a heat sink interior of the body below the ceiling 1 in the form of two heat exchangers spaced apart in a longitudinal direction, that is in spaced apart in the direction of a longitudinal axis A. A further heat exchanger 3A is provided outside of the body as a heat sink and is interconnected with the internal heat exchangers 3, 3' as is known in the art. The fan 4 is arranged between the two heat exchangers 3, 3' with the fan blowing air in the direction of the longitudinal axis A through the two heat exchangers.

The guiding plate 5 is arranged in parallel spaced relationship from the wall 2 which is opposite from the door 14, such that a part of the total air volume from the heat exchanger 3 flows downwards between the wall 2 and the guiding plate 5 and discharges at a point 16 near a bottom or floor 12 of the body. The other part of the total air volume flows through the other heat exchanger 3' and discharges at 18 in the direction of the longitudinal axis A. Preferably the discharge point 18 is at a distance of approximately 60–80% of the length of the body from the end wall 2.

Preferably the spacing of the guide plate 5 from the end wall 2 is approximately 20 to 70 mm. Preferably the discharge velocity of the air from the heat exchangers 3, 3' is approximately 8 to 15 mm per second.

The air guiding according to the invention ensures an optimal air stream through the cargo in the refrigeration operation and also in the heating operation and enables to quickly compensate temperature losses in the cargo after a loading and discharging operation. At the same time, the free air flow across the cargo guarantees high air ejection distances backwards and a very fast refrigeration of the warm and moist air which enters the interior of the body because of frequent door opening when distributing the cargo. The refrigeration, heating and air efficiencies therefore are at least 50% higher than with all evaporators for multicompartment vehicles offered at the marketplace also with multiple divided bodies or for split refrigeration units. By this means, all critical loading and temperature conditions, in particular for multi-compartment vehicles, may be easily controlled.

More so, the high air throughput with the air guiding according to the invention will also compensate the critical cold temperature emission from a deep freezing compartment into an adjacent fresh food compartment in the area of the unavoidable cold bridges and leakages in the wall, bottom and ceiling area, such that with multi-compartment vehicles, frost damages at the sensitive fresh products can safely be excluded for the first time.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A refrigerated body generally in the form of a cuboid with insulated walls, floor and ceiling, and a door in one of the walls, with a refrigeration unit having a heat exchanger in the body as a heat sink, and a heat exchanger outside the body as a heat source, wherein the heat exchanger serving as a heat sink is arranged below the ceiling of the body at one of the walls in the form of at least two heat exchangers spaced apart, at least one fan is arranged between the two heat exchangers with the fan blowing air through the two heat exchangers, a guiding plate is arranged in parallel spaced relationship from a wall longitudinally opposite from the door, such that a part of the total air volume from the heat exchangers is directed into and flows downwards between said opposite wall and the guiding plate and discharges near the floor of the body, and another part of the total air volume from the heat exchangers discharges longitudinally toward the wall with the door.

2. A refrigerated body according to claim 1, wherein the total air volume flows through the heat exchangers and in approximately equal parts.

3. A refrigerated body according to claim 2, wherein the distance of the guiding plate from said opposite wall is approximately 20 to 70 mm.

4. A refrigerated body according to claim 2, wherein a discharge velocity of the air from the heat exchangers is approximately 8 to 15 ms.

5. A refrigerated body according to claim 1, wherein four fans and eight heat exchangers are arranged side by side in spaced relationship crosswise to the longitudinal axis A of the body.

6. A refrigerated body according to claim 5, wherein the fans are alike radial fans with vertically oriented shafts.

7. A refrigerated body according to claim 1, wherein guiding devices narrowing the air stream like a nozzle are arranged at the air discharge side of each heat exchanger.

8. A refrigerated body according to claim 7, wherein said guiding devices include control blades therein for increasing velocity and ejection distance for air exiting said guiding devices.

9. A refrigerated body according to claim 1, including a ceiling air duct is positioned below the ceiling, with the air duct extending from the heat exchanger to the area of the opposite front wall over a length of 60 to 80% of the body.

10. A refrigerated body according to claim 1, wherein the heat exchangers are controllable individually.

11. A refrigerated body according to claim 1, wherein the heat exchangers are controllable in groups.

12. A refrigerated body according to claim 1, wherein a plurality of fans are provided which are controllable individually.

13. A refrigerated body according to claim 1, wherein plurality of fans are provided which are controllable in groups.

14. A refrigerated body according to claim 1, wherein the heat exchangers are adapted to be selectively defrosted independently of one another.

15. A refrigerated body comprising:
   a cuboid with insulated walls, floor and ceiling, and a door in one of the walls,
   a refrigeration unit having a first heat exchanger unit positioned within said body as a heat sink and a second heat exchanger unit positioned outside of said body as a heat source, said heat sink heat exchanger unit comprising at least two heat exchangers spaced apart,
   at least one fan arranged to blow air through a pair of heat sink heat exchangers,
   a guiding plate arranged in parallel spaced relationship from a wall opposite said door extending from a first end near said ceiling to a second end near said floor,
   a connector extending between at least one of said heat sink heat exchangers and a space between said guiding plate and said opposite wall at said first end of said guiding plate to direct a first part of a total air flow volume from said at least one fan downward between said opposite wall and said guiding plate to discharge said first part of said total air flow volume near said floor of said body, and
   an air outlet to direct a second part of said total air flow volume from said at least one fan and heat sink heat exchangers along said ceiling in a direction toward the wall with said door.

16. A refrigerated body according to claim 15, wherein said heat sink heat exchangers comprise two heat exchangers spaced apart in a longitudinal direction extending between said opposite wall and said wall with said door, with said fan positioned between said two heat exchangers, and with said heat exchangers and said fan arranged at said ceiling within said body.

17. A refrigerated body according to claim 15, wherein said body is divided into multiple compartments and a fan and two heat sink heat exchangers are located in each compartment.

18. A refrigerated body according to claim 15, wherein an air duct is positioned below said ceiling and extending from a first end near said opposite wall to a second end positioned 60% to 80% of the distance toward said wall with said door, and a second connector is provided between at least one of said heat sink heat exchangers and said first end of air duct.

19. A refrigerated body comprising:
   a cuboid with insulated walls, floor and ceiling, and a door in one of the walls,
   a refrigeration unit having a first heat exchanger unit positioned within said body as a heat sink and a second heat exchanger unit positioned outside of said body as a heat source, at least one fan arranged to cause air to flow through said heat sink heat exchanger,
   a guiding plate arranged in a spaced relationship from a wall opposite said door extending from a first end near said ceiling to a second end near said floor,
   a conduit to direct a first part of a total air flow volume from said fan into a space between said guiding plate and said opposite wall at said first end of said guiding plate to discharge said first part of said total air flow volume near said floor of said body, and
   an air outlet to direct a second part of said total air flow volume from said fan along said ceiling in a direction toward the wall with said door.

\* \* \* \* \*